United States Patent [19]

Kazama

[11] Patent Number: 5,367,419
[45] Date of Patent: Nov. 22, 1994

[54] FLOATING MAGNETIC HEAD SLIDER WITH FLEXURE WINGS LOCATED WITHIN SLIDER L-SHAPED MEMBERS AND UPPER SURFACE OF SLIDER

[75] Inventor: Toshio Kazama, Nagaoka, Japan

[73] Assignee: Alps Electric Co., Ltd., Tokyo, Japan

[21] Appl. No.: 955,612

[22] Filed: Oct. 2, 1992

[30] Foreign Application Priority Data

Oct. 2, 1991 [JP] Japan .................................. 3-255587
Oct. 4, 1991 [JP] Japan .................................. 3-89665
Aug. 7, 1992 [JP] Japan .................................. 4-61538

[51] Int. Cl.5 .......................................... G11B 21/21
[52] U.S. Cl. .................................... 360/103; 360/104; 369/44.22
[58] Field of Search ............................. 360/103–104; 369/44.22

[56] References Cited

U.S. PATENT DOCUMENTS

| 4,167,765 | 9/1979 | Watrous | 360/103 |
| 4,769,727 | 9/1988 | Mao | 360/103 |
| 4,796,127 | 1/1989 | Wada et al. | 360/103 |
| 4,897,915 | 2/1990 | Ito | 360/103 |
| 4,972,280 | 11/1990 | Iwata | 360/103 |
| 5,196,974 | 3/1993 | Higashiya et al. | 360/103 |
| 5,202,863 | 4/1993 | Miyatake et al. | 360/104 |

FOREIGN PATENT DOCUMENTS 5211922 1/1977 Japan .................................. 360/103

Primary Examiner—A. J. Heinz
Assistant Examiner—George J. Letscher
Attorney, Agent, or Firm—Guy W. Shoup; Patrick T. Bever

[57] ABSTRACT

A floating magnetic head of the type in which a slider is joined to the free end of a magnetic head support device includes wings provided in the free end section of the magnetic head support device and engaged with notches provided in slider sections excluding the ABS surface thereof, thereby providing a high level of resistance to impacts and vibrations. Further, a floating magnetic head of the type in which a slider having a magnetic core is attached to the front end of a suspension element through the intermediation of a flexure includes: a recess formed in the middle section of a flexure attachment surface of the slider and having a bottom surface to which the flexure is attached; walls formed on both sides of the recess; and grooves for weight balance adjustment formed in the walls, whereby the center of gravity of the slider coincides with the position of the load protuberance not only in the height direction of the slider but also in the horizontal direction of the same, so that the a stable floating attitude can be maintained during seeking operation, etc.

5 Claims, 10 Drawing Sheets

FLOATING MAGNETIC HEAD SLIDER WITH FLEXURE WINGS LOCATED WITHIN SLIDER L-SHAPED MEMBERS AND UPPER SURFACE OF SLIDER

BACKGROUND OF THE INVENTION

1. Field of the Invention

This invention relates to a floating magnetic head for recording and reproducing information on a magnetic recording medium in a magnetic-disk storage apparatus, a magneto-optical-disk storage apparatus or the like.

2. Description of the Related Art

It is necessary for the slider of a floating magnetic head for use in a magnetic-disk drive device to follow the changing topography of the surface of the moving disk, such as a swaying motion of the disk surface during the rotation of the magnetic disk, so that data may be stored and read correctly. An example of a conventional floating magnetic head designed to meet this requirement is described, for example, in U.S. Pat. No. 4,167,765.

FIGS. 11 through 14 show the structure described in U.S. Pat. No. 4,167,765, which constitutes a pertinent prior art of the present invention.

FIG. 11 shows the arm assembly of a floating magnetic head. This assembly includes a suspension element 160 which is made, for example, of stainless steel. The suspension element 160 is attached, by screws 163 or welds, to a rigid arm section 161 made, for example, of aluminum. The rigid arm section 161 is joined to a mounting segment 162, which is mounted to an actuator assembly (not shown).

Fastened to the free end of the suspension element 160 is a flexure 170, which has a center tongue 171 supporting a slider 180. A load protuberance 173 is provided on the center tongue 171. The contact point between the free end section of the suspension element 160 and the load protuberance 173 constitutes a fulcrum about which the slider 180 may pitch and roll in order to follow the changing topography of a magnetic disk 1100. During the rotation of the magnetic disk 1100, air flowing between the magnetic disk 1100 and the slider 180 generates an air spring. To apply the requisite load for keeping a balance with this air spring to the slider 180, the free end section of the suspension element 160 is in contact with the load protuberance 173 to apply a pressure to the slider 180.

FIG. 15 shows an example of the support structure of a conventional floating magnetic head. In the structure shown in FIG. 15, a slider 16 is attached to the free end of a suspension element 10 through the intermediation of a flexure 18, and provided at the front end of the slider 16 is a magnetic core 14 having a coil 12 wound around it. Provided at the other end of the suspension element 10 is a mount 20, by means of which the suspension element 10 is attached to the body of a magnetic head device (not shown).

As shown in FIG. 16, the flexure 18 consists of a center tongue 20 and a peripheral section 22 around it. Provided on this center tongue 20 is a load protuberance 24 protruding on the side of the suspension element 10.

The peripheral section 22 is secured onto the suspension element 10 by spot welding, and the center tongue 20 is glued to the slider 16.

The upper surface of the slider 16 shown in FIG. 16 is hereinafter referred to as a flexure attachment surface 28.

The load protuberance 24, provided on the center tongue 20, is in contact with the free end section 26 of the suspension element 10. Due to this arrangement, the resilient load from the suspension element 10 is transmitted by way of the apex of the load protuberance 24 to the slider 16, attached under the flexure 18.

SUMMARY OF THE INVENTION

Due to the cantilever-spring-like structure of the suspension element for its slider, the above-described conventional floating magnetic head is easily affected by vibrations and impacts which may cause deformation of the center tongue, etc. Such a deformation is particularly liable to occur when no magneto-optical disk has been inserted in the magneto-optical disk storage apparatus, for the floating magnetic head is then in a free state.

In a first aspect of this invention, a means for solving this problem in the prior art is provided.

It is a first object of this invention to provide a floating magnetic head which is highly resistant to vibrations and impacts.

To achieve the first object, there is provided, in accordance with the first aspect of this invention, a floating magnetic head of the type in which a slider is joined to the free end of a magnetic head support device, the floating magnetic head comprising: notches provided in sections of the slider excluding an air bearing surface (ABS) thereof; and wings provided in the free end section of the magnetic head support device and engaged with the notches.

In the above-described floating magnetic head, the wings provided in the free end section of the magnetic head support device are engaged with the notches provided in slider sections excluding the ABS thereof, so that the floating magnetic head is protected from breakage even if impacts or vibrations are applied thereto.

In a floating magnetic head of the type as shown in FIGS. 15 and 16, the center of gravity of the slider 16 is at a position which is inside the slider 16 and nearer to the leading side 3 thereof and which is below the flexure attachment surface 28. As a result, it has been impossible for the center of gravity of the slider 16 of a magnetic head of this type to coincide with the position of the load protuberance 24 with respect to the height direction of the slider 16.

The failure of the center of gravity of the slider 16 to coincide with the position of the load protuberance 24 leads to the following problem.

When, during operation of the floating magnetic head, a large acceleration is applied to the slider 16, as in the case, in particular, of a seeking operation, a moment of inertia is generated in the magnetic head. This moment of inertia may lead to the generation of a torque around the load protuberance 24 in the slider 16.

To overcome the above problem, the present inventors proposed in Japanese Patent Application No. 3-133081 a floating magnetic head as shown in FIGS. 17 and 18.

In the floating magnetic head proposed in the above-mentioned Japanese patent application, the slider 16 is attached to the front end of the suspension element 10 through the intermediation of a flexure 18. FIG. 18 shows the slider 16. As shown in the drawing, a recess 34 is formed in the middle section of the slider 16, whereby a wall 33 is formed on each side of the recess 34. The flexure 18 is attached to the bottom surface of the recess 34.

As a result of the attachment of the flexure 18 to the bottom surface of the recess 34, the position at which the center of gravity of the slider 16 vertically moves substantially coincides with the position of the load protuberance 24 with respect to the height direction of the slider 16 (indicated by the arrow A in FIG. 17).

In this floating magnetic head, the center of gravity of the slider 16 substantially coincides with the position of the load protuberance with respect to the direction of the height of the slider 16, so that a stable floating condition can be obtained even during high-speed seeking operation, which involves great acceleration.

Further, in order to attain a perfect coincidence of the center of gravity of the slider 16 with the position of the load protuberance 24, the present inventors investigated the possibility of achieving positional coincidence not only in the direction of the height of the slider 16 but also in the horizontal direction thereof.

However, if the flexure 18 is attached simply in such a way as that the load protuberance 24 is positioned nearer to the leading side 3, where the center of gravity of the slider 16 exists, the slider cannot be set in the horizontal position relative to the magnetic recording medium, so that the floating performance of the magnetic head may be adversely affected.

In second to fourth aspects of this invention, an attempt has been made to solve the above problem. Thus, it is another object of this invention to provide a floating magnetic head in which the center of gravity of the slider 16 coincides with the position of the load protuberance with respect to the horizontal direction as well as the direction of height of the slider 16.

In accordance with the second aspect of this invention, the above problem is solved by a floating magnetic head of the type in which a slider having a magnetic core is attached to the front end of a suspension element through the intermediation of a flexure, wherein a recess is formed in the middle section of a flexure attachment surface of the slider; walls are formed on both sides of the recess; the flexure is attached to a bottom surface of the recess; and grooves for weight balance adjustment are formed in the walls.

In accordance with the third aspect of this invention, the above problem is solved by a floating magnetic head of the type in which a slider having a magnetic core is attached to the front end of a suspension element through the intermediation of a flexure, wherein a recess is formed in the middle section of a flexure attachment surface of the slider; walls are formed on both sides of the recess; the flexure is attached to a bottom surface of the recess; and wings for weight balance adjustment are protruding from the walls.

In accordance with the fourth aspect of this invention, the above problem is solved by a floating magnetic head of the type in which a slider having a magnetic core is attached to the front end of a suspension element through the intermediation of a flexure, wherein a recess is formed in the middle section of a flexure attachment surface of the slider; walls are formed on both sides of the recess; and at least either a material having high specific gravity or a material having low specific gravity is incorporated in a part of the slider.

With the floating magnetic head according to the second aspect of this invention, a recess is formed in the middle section of the slider attachment surface, and grooves for weight balance adjustment are formed in the walls, so that it is possible to cause the center of gravity of the slider to coincide with the position of the load protuberance by appropriately adjusting the depth of the recess and the positions of the grooves.

With the floating magnetic head according to the third aspect of this invention, a recess is formed in the middle section of the slider attachment surface, and protruding wings for weight balance adjustment are formed in the walls, so that it is possible to cause the center of gravity of the slider to coincide with the position of the load protuberance by appropriately adjusting the depth of the recess and the positions of the wings.

In the floating magnetic head according to the fourth aspect of this invention, a recess is formed in the middle section of the slider attachment surface, and at least either a material having high specific gravity or a material having low specific gravity is incorporated in a part of the slider, so that it is possible to cause the center of gravity of the slider to coincide with the position of the load protuberance by appropriately adjusting the depth of the recess and appropriately determining the portion of the slider which is to be formed of the material having high specific gravity or the material having low specific gravity or the area of the portion formed of the material having high specific gravity or the material having low specific gravity.

DESCRIPTION OF THE PREFERRED EMBODIMENTS

An embodiment of the first aspect of the present invention will be described with reference to the drawings.

Figure 1:
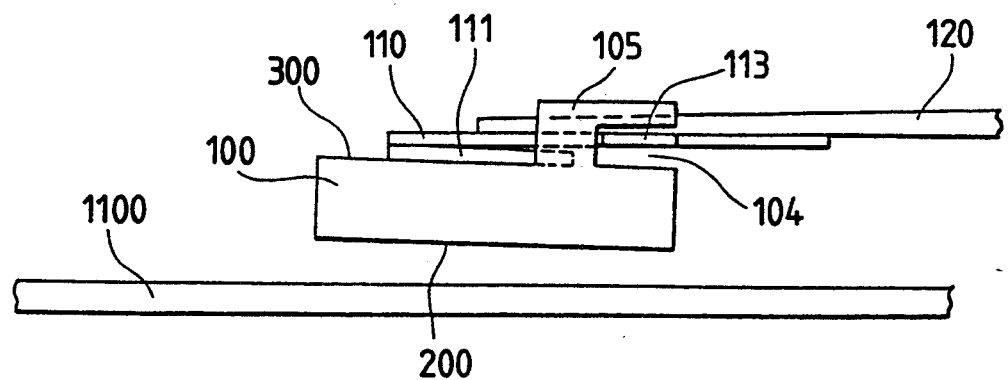
FIG. 1 is a side view showing the essential components of a floating magnetic head according to an embodiment of the first aspect of this invention.
Figure 2:
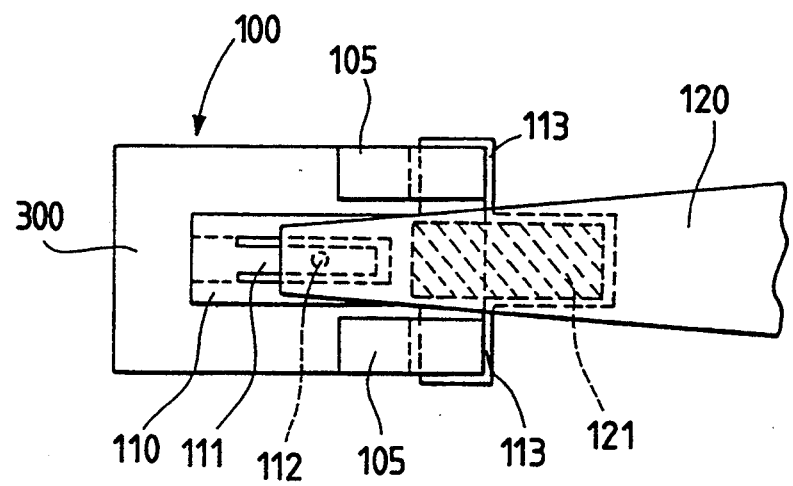
FIG. 2 is a front view showing the essential components of a floating magnetic head according to an embodiment in the first aspect of this invention.
Figure 3:
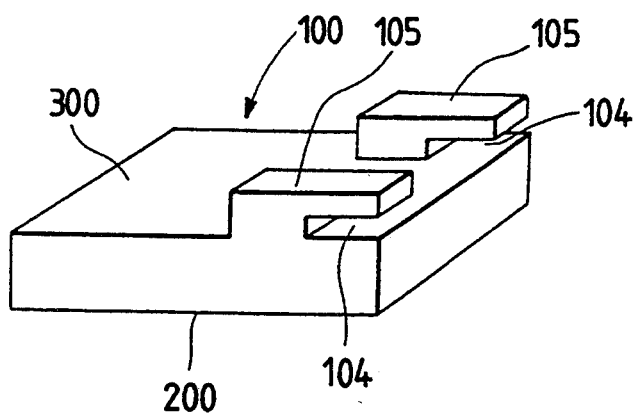
FIG. 3 is a perspective view showing the structure of a slider used in a floating magnetic head according to an embodiment in the first aspect of this invention.
Figure 4:
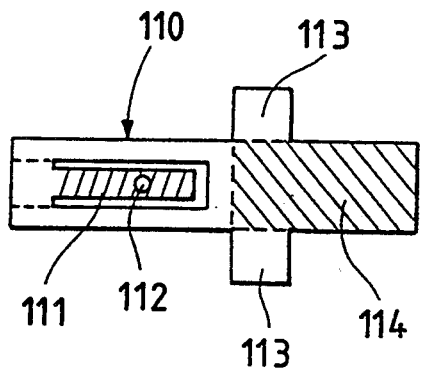
FIG. 4 is a front view showing the structure of a flexure used in a floating magnetic head according to an embodiment in the first aspect of this invention.

FIG. 1 is a side view showing the essential components of a floating magnetic head according to an embodiment of the first aspect of this invention; FIG. 2 is a front view of the same; FIG. 3 is a perspective view of a slider used therein; and FIG. 4 is a front view showing the structure of a flexure used in the first aspect of this invention shown in FIG. 1.

The first aspect of this invention pertains to the structure of a flexure 110 attached to the free end of a suspension element 120, the structure of a slider 100 attached to the flexure 110, and a combined structure of these components. Accordingly, the structure for mounting the suspension element 120 onto the arm section, etc. according to the first aspect of this invention are omitted in the drawings.

The first aspect of this invention will be described with reference to FIGS. 1 through 4. FIG. 3 is a perspective view of the slider used in the floating magnetic head of FIG. 1 according to an embodiment of the first aspect of this invention. Referring to the drawing, the slider 100 includes an air bearing surface (ABS) 200 to be opposed to a magnetic disk 1100, and an attachment surface 300 on the opposite side to which a flexure 110 is to be attached. Provided on both sides of the attachment surface 300, in a dimensional relationship allowing the flexure 110 to be attached thereto, are L-shaped protrusions 105 each defining a notch 104 having a width larger than the thickness of wings 113 of the flexure 110. The L-shaped protrusions 105 are formed integrally with the slider 100 or separately therefrom.

In the side view of FIG. 1, the floating magnetic head is floating above the magnetic disk 1100 and operating in this state. The floating magnetic head consists of a combination of the suspension element 120, the flexure 110 and the slider 100.

Next, the construction of the floating magnetic head according to an embodiment of the first aspect of this invention will be described with reference to FIGS. 1 through 4.

The suspension element 120 is made, for example, of stainless steel. An attachment section 114 of the flexure 110, made of stainless steel or the like, is joined to an attachment section 121 at the free end of the suspension element 120 by laser welding or the like, and the slider 100 is joined to a center tongue 111 provided at the free end of the flexure 110, by an adhesive consisting of resin or the like. Further, provided on both sides of the attachment section 114 of the flexure 110 are wings 113, which are engaged with the notches 104 provided in the slider 100, with appropriate gaps therebetween.

By "appropriate gaps" is meant a dimension which maintains the wings 113 and the notches 104 out of contact in the normal floating condition of the floating magnetic head and which allows them to come into contact with each other when abnormal vibrations or impacts are applied. The dimension can be set arbitrarily. Accordingly, the dimension of these gaps can be arbitrarily set depending upon the specifications of the floating magnetic head.

Further, provided in substantially the middle section of the center tongue 111 of the flexure 110, on the surface on the opposite side of the attachment surface of the slider 100, is a round load protuberance 112.

Figure 5:
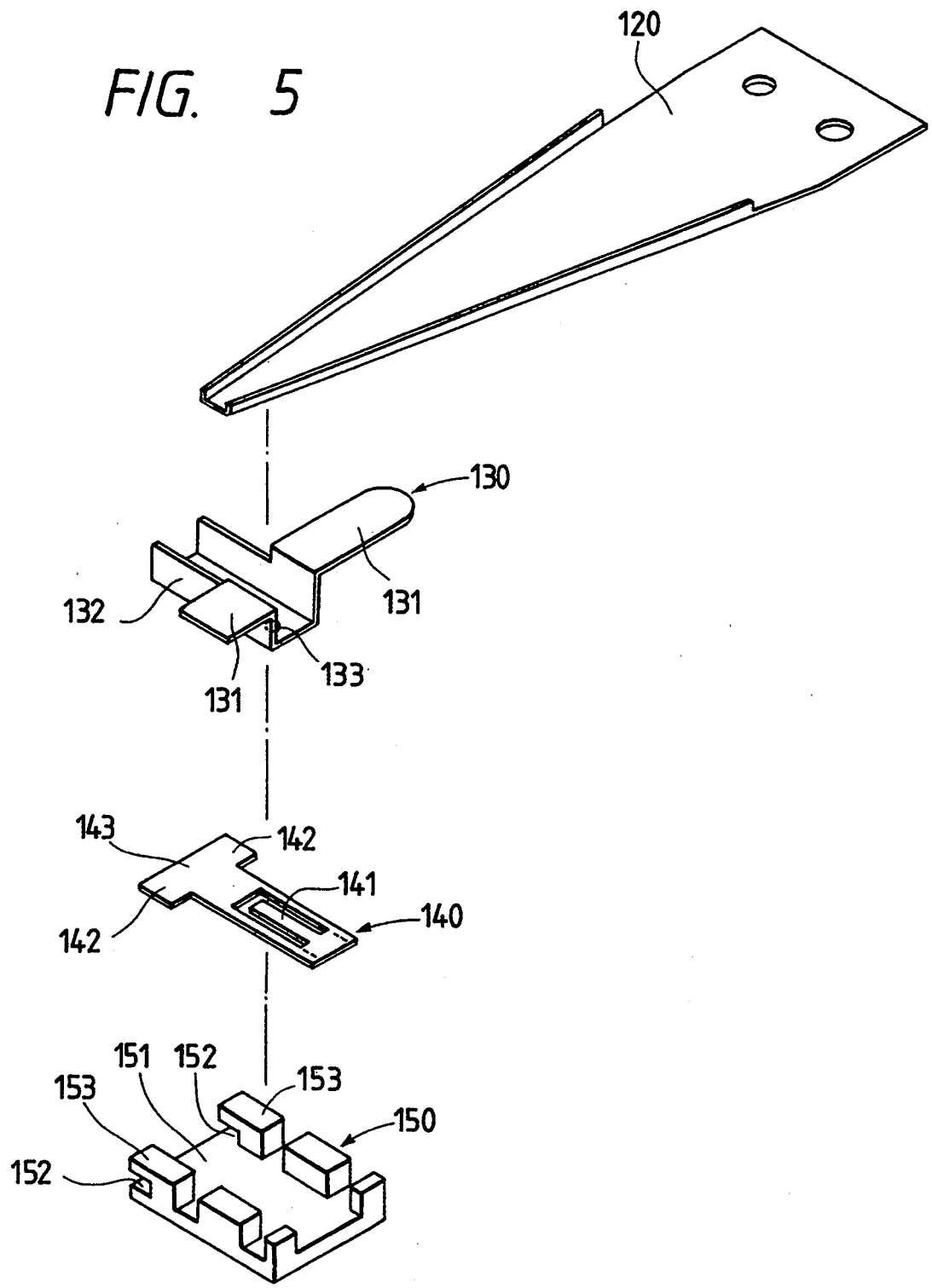
FIG. 5 is an exploded perspective view showing the essential components of a floating magnetic head according to a second embodiment in the first aspect of this invention.

Next, a second embodiment of the first aspect of the present invention will be described with reference to FIG. 5, which is an exploded perspective view showing the principal components of a floating magnetic head according to the second embodiment of the first aspect of this invention.

The suspension element 120 is made, for example, of stainless steel. Attachment surfaces 131 of an adapter 130, which is formed of stainless steel or the like, are attached to the free end section of the suspension element 120 by laser welding or the like. The adapter 130 has a U-shaped section, on both sides of which the joint surface 131 are formed. Further, a round load protuberance 133 is formed at the bottom of the U-shaped section, on the opposite side of the attachment surface of the suspension element 120. Further, an attachment surface 132 is provided at the bottom of the U-shaped section of the adapter 130, on the opposite side of the load protuberance 133. Attached to the attachment surface 132 by laser welding or the like is an attachment surface 143 provided at one end of a flexure 140. Provided in the section of the flexure 140 opposite to the attachment surface 143 is a center tongue 141, which is in contact with the load protuberance 133 provided on the adapter 130. Further, an attachment surface 151 provided on the opposite side of that surface of a slider 150 which is to be opposed to a magnetic disk is joined to the center tongue 141 by an adhesive consisting of resin or the like.

As in the first embodiment, the slider 150 has L-shaped protrusions 153 defining notches 152, which are engaged with wings 142 provided on both sides of the attachment surface 143 of the flexure 140, with appropriate gaps therebetween.

The load protuberance may be provided on the flexure, as in the first embodiment.

Of the floating magnetic head structures according to the two embodiments of the first aspect of this invention which have been described, the sections excluding the sliders 100 and 150 will be referred to as magnetic head support devices. Thus, the magnetic head support device of the first embodiment is a combination of the suspension element 120 and the flexure 110, and the magnetic head support device in the second embodiment is a combination of the suspension element 120, the adapter 130 and the flexure 140.

Although in the above magnetic head support devices the wings 113 and 142 are provided on the flexure 110 and 140, these wings may be formed on the suspension element 120 or the adapter 130 instead of being formed on the flexure. Further, while in the above embodiments two wings are provided, it is also possible to provide one or any number of wings. Further, the configuration of the wings can be determined arbitrarily, as long as they can be engaged with the notches 104 and 152 of the sliders 100 and 150 with appropriate gaps therebetween. Likewise, the notches of the slider are not restricted to those in the above-described embodiments. They can be formed in any configuration and at any positions excluding the ABS of the slider, as long as they can be engaged with the wings with appropriate gaps therebetween. Further, it is also possible to form one or any number of notches.

Further, the L-shaped protrusions 105 and 153 of the sliders 100 and 150, defining the notches 104 and 152, may be formed integrally with the sliders or joined to the sliders afterwards. Further, the configuration of the protrusions may also be determined arbitrarily as long as they define notches which can be engaged with the wings with appropriate gaps therebetween.

Further, it is possible to form the suspension element and the flexure of the magnetic head support device as a single piece having their respective functions.

Actually, magnetic cores, windings, etc. forming magnetic circuits are incorporated in the sliders 100 and 150 of the floating magnetic heads described above. Such components, however, are omitted here unless they pertain directly to the first aspect of this invention.

Thus, in accordance with the first aspect of this invention, wings provided in the free end section of the magnetic head support device are engaged with notches provided in the slider section excluding the ABS thereof, with appropriate gaps therebetween, so that during normal operation of the magnetic-disk storage device, the wings and the notches of the floating magnetic head are not brought into contact with each other by minute changes accompanying the floating motion of the floating magnetic head. If strong impacts or vibrations are applied to the floating magnetic head, the wings are retained inside the notches and no further changes take place. Accordingly, the center tongue is not deformed and the floating magnetic head is protected from breakage.

As described above, in the floating magnetic head according to the first aspect of this invention, the wings provided in the free end section of the magnetic head support device are engaged with the notches provided in a section of the slider excluding the ABS surface thereof, so that if impacts or vibrations are applied to the floating magnetic head, the wings are retained inside the notches thereby protecting the floating magnetic head from breakage. Thus, a floating magnetic head can be provided which is resistant to impacts and vibrations.

In the following, the floating magnetic heads according to the second to fourth aspects of this invention will be described in detail with reference to the drawings. The components which are the same as those of the above-described prior-art examples will be indicated by the same reference numerals, and the explanation of those components will be simplified.

Figure 6:
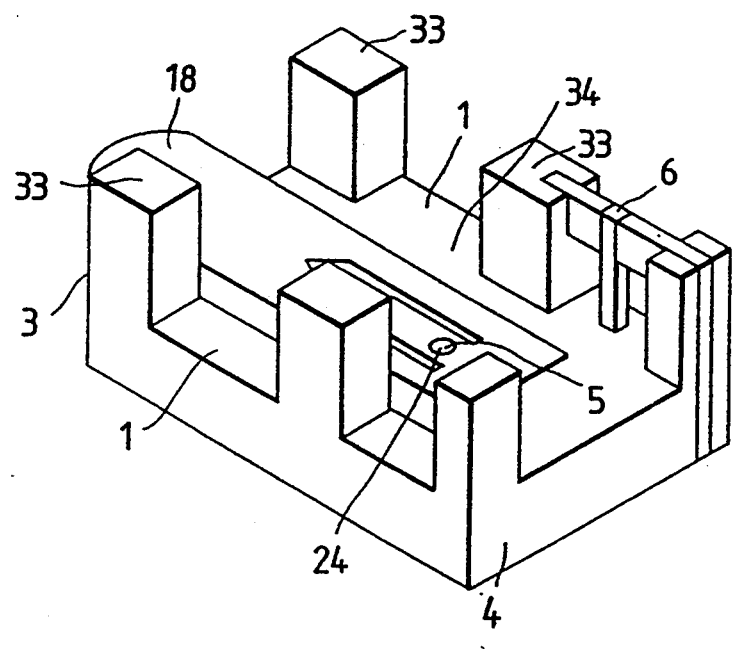
FIG. 6 is a perspective view showing the slider of a floating magnetic head according to the second aspect of this invention.
Figure 7A:
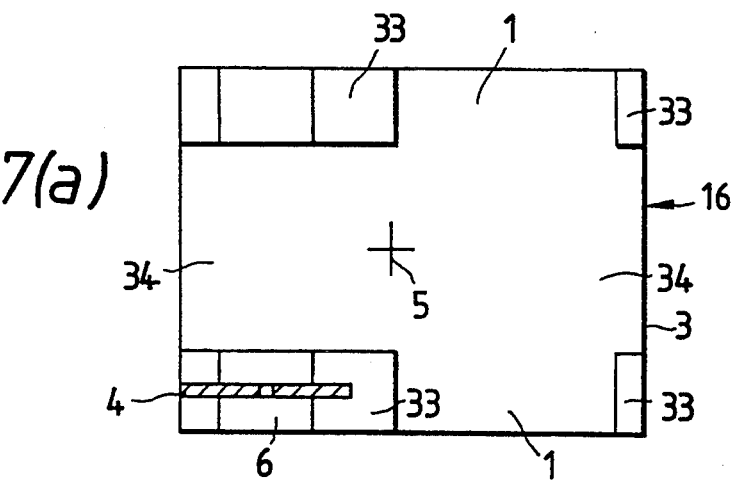
FIG. 7(a) is a top plan view of the slider of the floating magnetic head according to the second aspect of this invention.
Figure 7B:
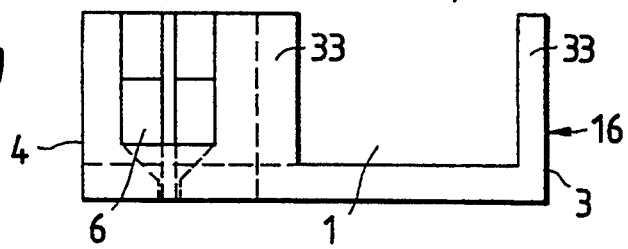
FIG. 7(b) is a side view of the slider of the floating magnetic head according to the second aspect of this invention.
Figure 7C:
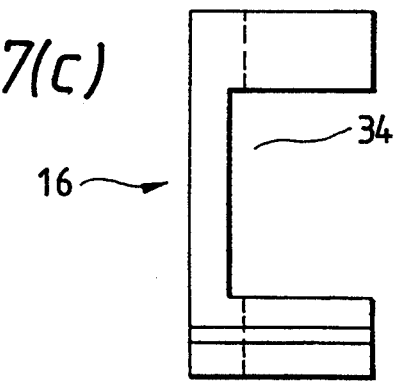
FIG. 7(c) is a view of the slider of the floating magnetic head according to the second aspect of this invention as seen from the trailing side.

FIG. 6 is a perspective view showing a part of the flexure 18 of the slider 16 of a floating magnetic head according to the second aspect of this invention; and FIG. 7 is a diagram showing the slider 16 only.

Formed in the middle section of the slider 16 is a recess 34 extending from the leading side 3 to the trailing side 4 thereof, and walls 33 are provided on both sides of the recess 34. Grooves 1 for weight balance adjustment are formed in those sections of the walls 33 which are nearer to the leading side 3. Further, a magnetic core section 6 is formed in the section of one of the walls 33 which is nearer to the trailing side 4.

In the floating magnetic head according to the second aspect of this invention, the bottom surface of the recess 34 formed on the slider 16 constitutes a flexure attachment surface 28. The depth of the recess 34 must be such that the position of the load protuberance 24 of the flexure 18 coincides with the center of gravity of the slider 16.

As a result of the provision of the grooves 1 in those sections of the walls 33 nearer to the leading side 3, the center of gravity of the slider 16 is shifted toward the trailing side 4. Thus, when the grooves 1 are formed, the center of gravity of the slider 16 can be shifted to a desired position by appropriately adjusting the positions, width and depth of the grooves 1.

Thus, it is possible to cause the center of gravity of the slider 16 to coincide with the position 5 where the load protuberance 24 is provided (the load protuberance position), with respect to the horizontal direction of the slider 16.

In this floating magnetic head, constructed as described above, the slider 16 includes the recess 34 and the walls 33 and, further, the grooves 1 formed in the walls 33, so that it is possible for the center of gravity of the slider 16 to perfectly coincide with the load protuberance position 5.

Thus, with this floating magnetic head, in which the center of gravity of the slider 16 coincides with the load protuberance position 5, it is possible to obtain a stable floating condition even during high-speed seeking, so that the slider 16 is prevented from coming into contact with the magnetic recording medium.

It should be noted in particular that the above arrangement can improve the stability at the time of stopping even with a floating magnetic head employing CSS (contact start stop).

Further, this arrangement enables the magnetic head to follow more closely the changing surface topography of the disk due to swaying motion of the disk and protrusions due to debris, texture, etc.

In the floating magnetic head according to the second aspect of this invention, the grooves 1 for weight balance adjustment are formed in the walls 33, so that by changing the positions and sizes of these grooves 1, it is possible to move the center of gravity of the slider 16 to a desired position with respect to the horizontal direction of the slider 16.

Further, by appropriately adjusting the depth of the recess 34 formed in the slider 16, it is possible to move the center of gravity of the slider 16 to a desired position with respect to the height direction of the slider 16.

Thus, with the floating magnetic head of the second aspect of this invention, the center of gravity of the slider 16 and the load protuberance position 5 can be made to coincide with each other, so that the slider 16 undergoes no change in the direction of height of the magnetic recording medium even when acceleration is applied thereto and can maintain a stable floating attitude even during seeking operation or when passing over a protrusion, thereby attaining a great improvement in terms of reliability and stability.

Figure 8:
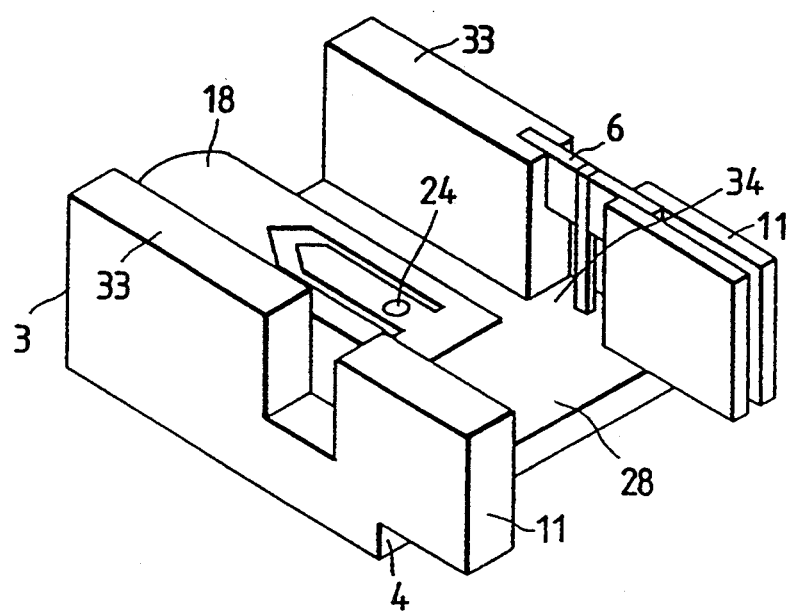
FIG. 8 is a sectional view showing the slider of a floating magnetic head according to the third aspect of this invention.
Figure 9A:
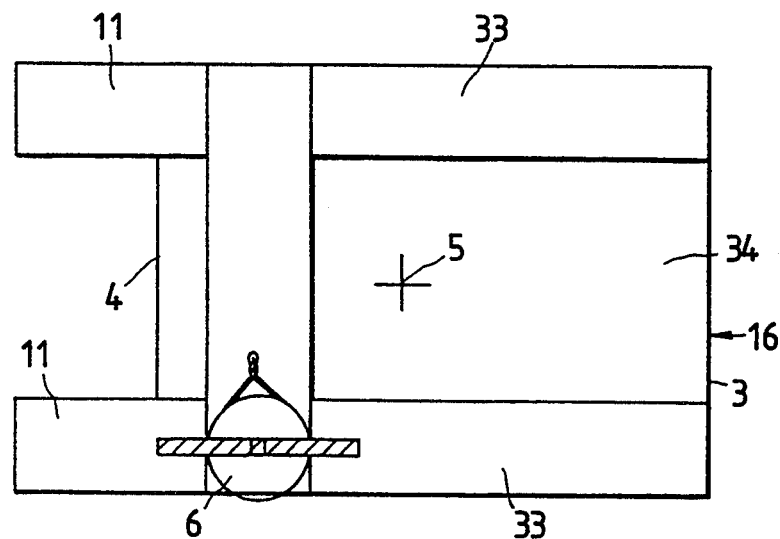
FIG. 9(a) is a top plan view of the slider of the floating magnetic head according to the third aspect of this invention.
Figure 9B:
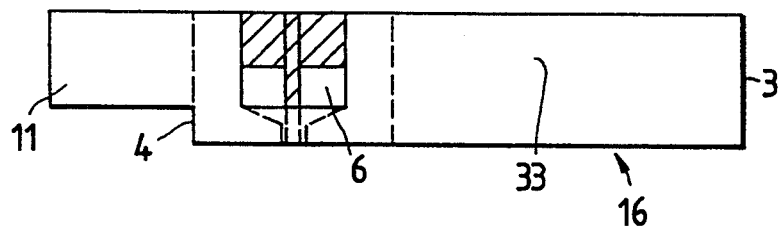
FIG. 9(b) is a side view of the slider of the floating magnetic head according to the third aspect of this invention.
Figure 9C:
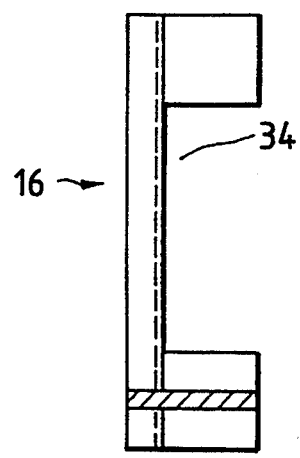
FIG. 9(c) is a view of the slider of the floating magnetic head according to the third aspect of this invention as seen from the trailing side.

FIG. 8 is a perspective view showing a part of the slider 16 and the flexure 18 of a floating magnetic head according to the third aspect of this invention. FIG. 9 is a diagram showing the slider 16.

The slider 16 has wings 11 for weight balance adjustment connected to those ends of the walls 33 which are on the trailing side 4, the walls 33 being provided by forming a recess 34 in the slider 16. A magnetic core section 6 is formed in the section of one wing 11 nearer to the trailing side 4 than to the reading side 3.

By connecting the wings 11 to the ends of the walls 33 on the trailing side 4, the center of gravity of the slider 16 is shifted toward the trailing side 4. By providing the wings 11 in this way, it is possible to move the center of gravity of the slider 16 to a desired position with respect to the horizontal direction of the slider 16.

Further, by appropriately adjusting the depth of the recess 34 formed in the slider 16, it is possible to move the center of gravity of the slider 16 to a desired position with respect to the height direction of the slider 16.

The floating magnetic head according to the third aspect of this invention provides the same effects as the floating magnetic head according to the second aspect.

Figure 10:
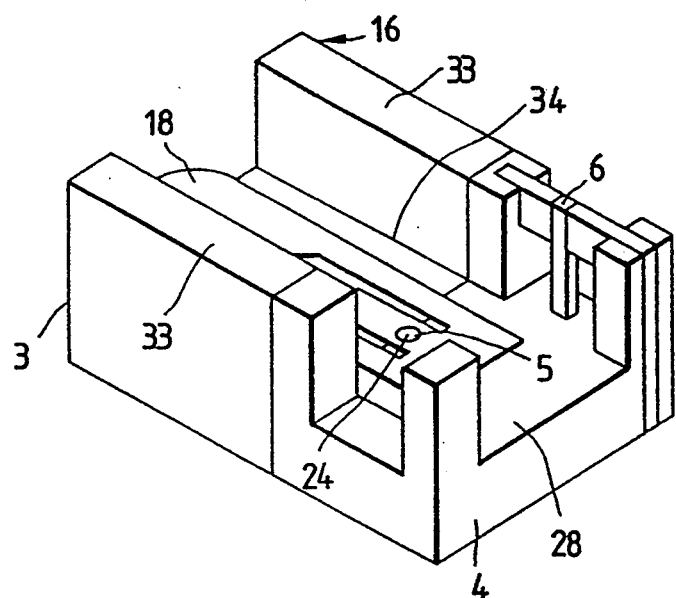
FIG. 10 is a perspective view showing the slider of a floating magnetic head according to the fourth aspect of this invention.
Figure 11:
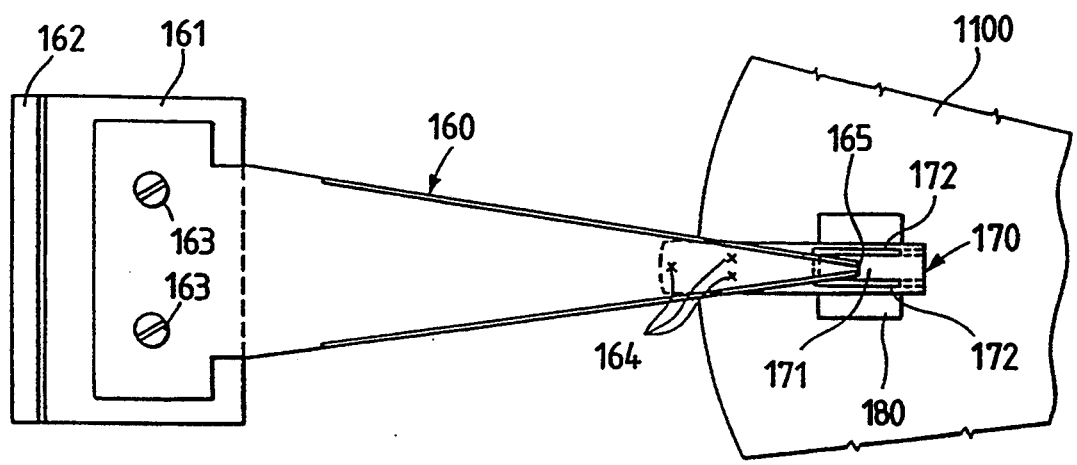
FIG. 11 is a front view showing the arm assembly of a conventional floating magnetic head.
Figure 12:
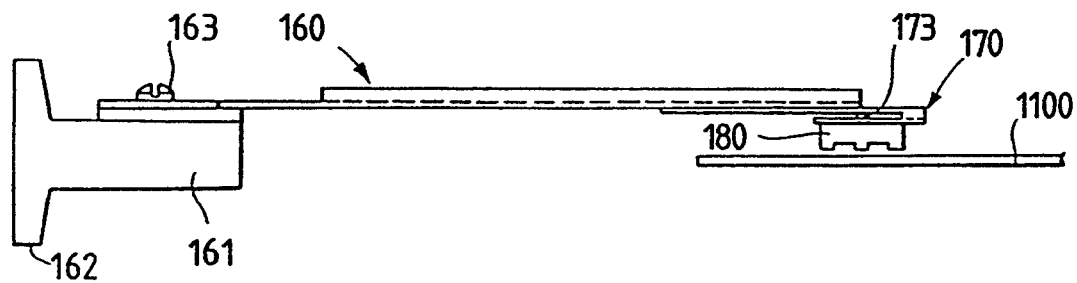
FIG. 12 is a side view showing the arm assembly of the conventional floating magnetic head.
Figure 13:
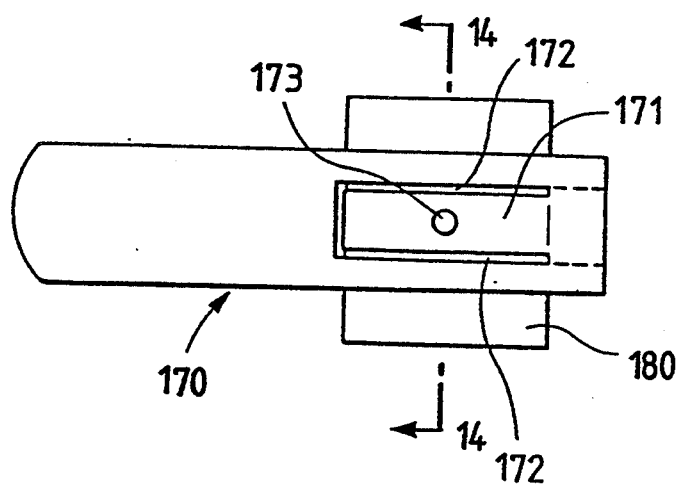
FIG. 13 is a front view showing the mounting structure for the flexure and the slider of the conventional floating magnetic head.
Figure 14:
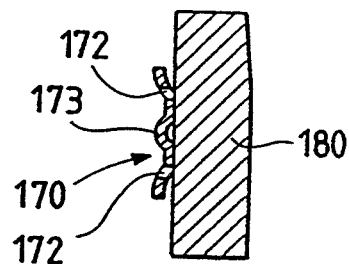
FIG. 14 is a sectional view, taken along the line A—A' of FIG. 13, of the mounting structure for the flexure and the slider of the conventional floating magnetic head shown in FIG. 13.
Figure 15:
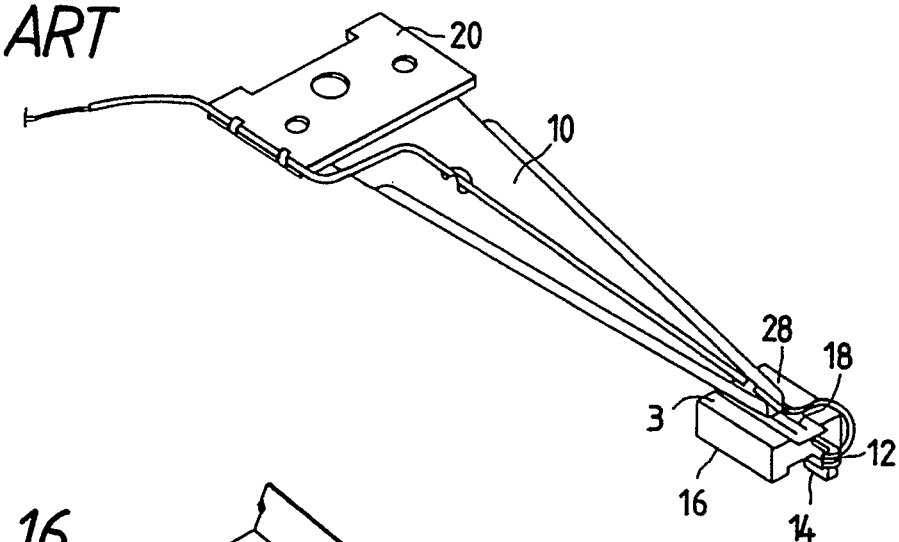
FIG. 15 is a perspective view showing a conventional floating magnetic head.
Figure 16:
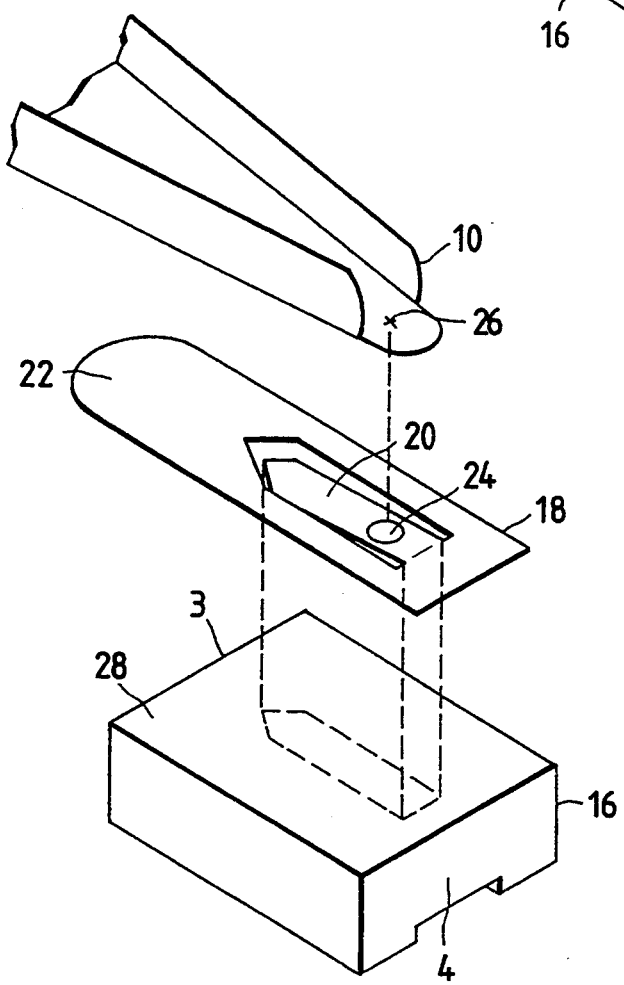
FIG. 16 is an enlarged view for illustrating the front end section of the conventional floating magnetic: head.
Figure 17:
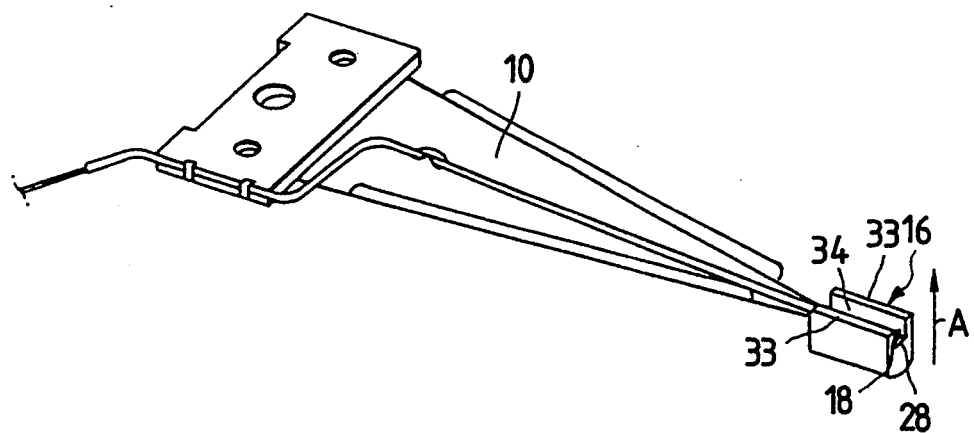
FIG. 17 is a perspective view showing a conventional floating magnetic head.
Figure 18:
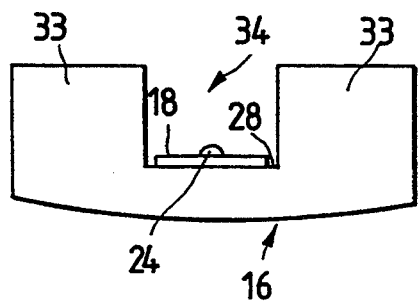
FIG. 18 is a view of the slider of the conventional floating magnetic head as seen from the trailing side.

FIG. 10 is a perspective view showing the slider 16 and a part of the flexure 18 of a floating magnetic head according to the fourth aspect of this invention. A portion of the slider 16 of this floating magnetic head which is on the trailing side 4 is made of a material having high specific gravity. By making a portion of the slider which is on the trailing side 4 of a material having high specific gravity, the center of gravity of the slider 16 is shifted toward the trailing side 4.

By appropriately determining the material having high specific gravity and the portion which is to be made of that material, it is possible to move the center of gravity of the slider 16 to a desired position with respect to the horizontal direction of the slider 16. An example of the material having high specific gravity is zirconia.

Further, by appropriately adjusting the depth of the recess 34 formed in the slider 16, it is possible to move the center of gravity of the slider 16 to a desired position.

The floating magnetic head according to the fourth aspect of this invention provides the same effects as the floating magnetic head according to the second aspect.

Further, in the fourth aspect of this invention, it is also possible to form a portion of the slider 16 which is on the leading side 3 of a material having low specific gravity. An example of the material having low specific gravity is alumina.

By thus forming a portion of the slider on the leading side 3 of a material having low specific gravity, the center of gravity of the slider 16 is shifted toward the trailing side 4.

By appropriately determining the area and position of the portion to be formed of a material having low specific gravity and by appropriately selecting that material, it is possible to move the center of gravity of the slider 16 and cause the position 5 of the load protuberance to coincide with the center of gravity of the slider 16.

While the grooves 1 and the wings 11 for weight balance adjustment of the floating magnetic heads according to the second and third aspects of this invention, described above, are shown as having a rectangular configuration, this should not be construed restrictively. The groove and the wings may have any type of configuration as long as they allow the position 5 of the load protuberance to coincide with the center of gravity of the slider 16.

In the floating magnetic head according to the second aspect of this invention of the type in which a slider having a magnetic core is attached to the front end of a suspension element through the intermediation of a flexure, grooves for weight balance adjustment are formed in walls of the slider, so that by appropriately determining the position where the grooves are formed, it is possible to cause the center of gravity of the slider to coincide with the position of the load protuberance with respect to the horizontal direction of the slider.

Further, since a recess is formed in the slider, it is possible, by appropriately adjusting the depth of this recess, to cause the center of gravity of the slider to coincide with the position of the load protuberance with respect to the vertical direction of the slider.

Thus, with the floating magnetic head according to the second aspect of this invention, the center of gravity of the slider perfectly coincides with the position of the load protuberance, so that the floating magnetic head undergoes no changes in the height direction of the magnetic recording medium even when acceleration is applied to the slider and can maintain a stable floating attitude even during seeking operation or when passing over a protrusion, thereby attaining a marked improvement in terms of reliability and stability.

With the floating magnetic head according to the third aspect of this invention, wings for weight balance adjustment are protruding from the walls of the slider and, by appropriately determining the size of these wings, it is possible to cause the center of gravity of the slider and the position of the load protuberance to coincide with each other in the horizontal direction of the slider.

Further, since a recess is formed in the slider, it is possible, by appropriately adjusting the depth of this recess, to cause the center of gravity of the slider to coincide with the position of the load protuberance with respect to the vertical direction of the slider.

Thus, with the floating magnetic head according to the third aspect of this invention, the center of gravity of the slider perfectly coincides with the position of the load protuberance, so that the floating magnetic head undergoes no changes in the height direction of the magnetic recording medium even when acceleration is applied to the slider and can maintain a stable floating attitude even during seeking operation or when passing over a protrusion, thereby attaining a marked improvement in terms of reliability and stability.

With the floating magnetic head according to the fourth aspect of this invention, at least either a material having high specific gravity and a material having low specific gravity is incorporated in a part of the slider, so that by appropriately determining the position and area of the portion to be formed of that material and by appropriately selecting the type of the material, it is possible to cause the center of gravity of the slider to coincide with the position of the load protuberance in the horizontal direction of the slider.

Further, since a recess is formed in the slider, it is possible, by appropriately adjusting the depth of this recess, to cause the center of gravity of the slider to coincide with the position of the load protuberance with respect to the vertical direction of the slider.

Thus, with the floating magnetic head according to the second aspect of this invention, the center of gravity of the slider perfectly coincides with the position of the load protuberance, so that the floating magnetic head undergoes no changes in the height direction of the magnetic recording medium even when acceleration is applied to the slider and can maintain a stable floating attitude even during seeking operation or when passing over a protrusion, thereby attaining a marked improvement in terms of reliability and stability.

What is claimed is:

1. A floating head assembly for supporting a read/write head over an information-bearing disk in a disk drive device, the floating head assembly comprising:
   a head supporting member having a free end;
   a flexure connected to the free end of the head supporting member, the flexure including a body and a pair of wings extending from the body; and
   a slider having an upper surface movably connected to the flexure and a pair of L-shaped members extending from the upper surface such that the L-shaped members and the upper surface define a pair of notches for receiving the wings;
   wherein when the slider is floating in a normal position over the information-bearing disk, the wings are located within the notches and separated from the L-shaped members and the upper surface.

2. A floating head assembly according to claim 1, wherein the flexure is connected directly to the head supporting member.

3. A floating head assembly according to claim 1, further comprising an adapter fixedly connected to the head supporting member, wherein the flexure member is connected to the adapter.

4. A floating head assembly according to claim 1, wherein the disk drive device is an optical disk drive device.

5. A floating head assembly according to claim 1, wherein the disk drive device is a magnetic disk drive device.

* * * * *